United States Patent
Terada et al.

(10) Patent No.: US 10,656,456 B2
(45) Date of Patent: May 19, 2020

(54) ELECTRO-OPTICAL DEVICE AND ELECTRONIC APPARATUS

(71) Applicant: SEIKO EPSON CORPORATION, Tokyo (JP)

(72) Inventors: Shuji Terada, Matsumoto (JP); Masahito Yoshii, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/284,264

(22) Filed: Feb. 25, 2019

(65) Prior Publication Data

US 2019/0265540 A1     Aug. 29, 2019

(30) Foreign Application Priority Data

Feb. 26, 2018 (JP) ................. 2018-031640

(51) Int. Cl.
*G02F 1/1335* (2006.01)
*G02F 1/1343* (2006.01)
*G02F 1/1337* (2006.01)

(52) U.S. Cl.
CPC .. *G02F 1/133512* (2013.01); *G02F 1/133707* (2013.01); *G02F 1/134336* (2013.01); *G02F 1/134363* (2013.01)

(58) Field of Classification Search
CPC ......... G02F 1/133512; G02F 1/133707; G02F 1/134336; G02F 1/134363
See application file for complete search history.

(56) References Cited

U.S. PATENT DOCUMENTS

| | | |
|---|---|---|
| 2009/0128720 A1 | 5/2009 | Toriyama et al. |
| 2014/0055684 A1 | 2/2014 | Murasaki et al. |
| 2016/0133656 A1* | 5/2016 | Shibata ............... G02F 1/13454 257/71 |
| 2017/0285396 A1 | 10/2017 | Nimura |

FOREIGN PATENT DOCUMENTS

| | | |
|---|---|---|
| JP | 2000-111955 A | 4/2000 |
| JP | 2005-024923 A | 1/2005 |
| JP | 2005-257836 A | 9/2005 |
| JP | 2008-298914 A | 12/2008 |
| JP | 2009-122256 A | 6/2009 |
| JP | 2009-128401 A | 6/2009 |
| JP | 2014-041243 A | 3/2014 |
| JP | 2016-95443 A | 5/2016 |
| JP | 2017-187569 A | 10/2017 |

* cited by examiner

*Primary Examiner* — Nathanael R Briggs
(74) *Attorney, Agent, or Firm* — Oliff PLC

(57) ABSTRACT

In a transmissive-type electro-optical device, a plurality of pixel electrodes each overlap with each of a plurality of openings surrounded by a plurality of first light-shielding portions extending in a first direction and a plurality of second light-shielding portions extending in a second direction. A width of the first light-shielding portion is greater than a width of the second light-shielding portion. In the opening, a size thereof in the second direction is smaller than a size thereof in the first direction. A center of each of the pixel electrodes is shifted toward the pre-tilt orientation along the second direction from a center of each of the openings.

8 Claims, 12 Drawing Sheets

ELECTRO-OPTICAL DEVICE AND ELECTRONIC APPARATUS

BACKGROUND

1. Technical Field

The invention relates to an electro-optical device and an electronic apparatus. In the electro-optical device, liquid crystal molecules are pre-tilted.

2. Related Art

A transmissive-type electro-optical device includes a first substrate having a surface provided with a plurality of pixel electrodes having translucency and a first oriented film covering the plurality of pixel electrodes, a second substrate having a surface facing the first substrate and provided with a second oriented film adjacent to the surface, and a liquid crystal layer provided between the first substrate and the second substrate. When viewed in a plan view in a vertical direction with respect to the first substrate, the plurality of pixel electrodes respectively overlap with a plurality of openings surrounded by a plurality of first light-shielding portions extending in a first direction and a plurality of second light-shielding portions extending in a second direction intersecting with the first direction.

Such an electro-optical device is known that employs a vertical orientation mode where, while no voltage is applied, a long axis of liquid crystal molecules is oriented in a substantially vertical direction with respect to a first substrate and a second substrate. In the electro-optical device employing the vertical orientation mode, oriented films cause the liquid crystal molecules to pre-tilt to control, when a voltage is applied, a direction in which the liquid crystal molecules incline. In the electro-optical device employing the vertical orientation mode, black display takes place in a substantially vertical orientation state, advantageously achieving higher contrast. If a difference in tone arises between pixels adjacent to each other, however, horizontal electric fields between pixel electrodes would cause an orientation failure to occur within openings, leading to a reduction in display quality. Such a configuration is proposed that respective pixel electrodes are relatively shifted in position to face in a pre-tilt orientation with respect to openings. According to the configuration described above, regions in which an orientation failure would occur respectively lie outside the openings of the pixels, while regions in which no orientation failure will occur respectively lie within the openings of the pixels, suppressing a reduction in display quality due to an orientation failure (see JP-A-2016-95443).

In some electro-optical devices, to secure wiring regions for scanning lines and data lines, for example, as well as to secure wider openings in pixels, a size in a first direction differs from a size in a second direction in each of the openings (see JP-A-2000-111955).

In an ordinary electro-optical device, pixels are each formed into a square shape, as well as openings of the pixels are also each formed into a square shape. As can be seen in the configuration described in JP-A-2000-111955, limitations in design, for example, would however sometimes require openings to be formed into a heteromorphic shape (rectangle). For example, narrowing pixel pitches to achieve finer pixels and shrunk substrates in size would require openings to each have a heteromorphic shape (rectangle) to secure the enough openings and enough light-shielding regions for arranging wires, capacitors, pixel transistors, and contacts, for example.

It has been found that, when openings are each formed into a heteromorphic shape (rectangle), while pixels are each formed into a square shape, as described above, how horizontal electric fields generated by pixel electrodes adjacent to each other would lower display quality differs between a long-side direction and a short-side direction of each of the openings.

JP-A-2016-95443 however does not mention at all if any measure is taken against a difference due to effects of horizontal electric fields when openings are each formed into a heteromorphic shape (rectangle).

SUMMARY

An advantage of some aspects of the invention is to provide an electro-optical device and an electronic apparatus capable of, when openings are each formed into a heteromorphic shape (rectangle), suppressing a reduction in display quality due to horizontal electric fields generated by pixel electrodes adjacent to each other.

For the issue described above, an electro-optical device according to an aspect of the invention includes a first substrate having, at one surface thereof, a pixel electrode having translucency and a first oriented film covering the pixel electrode, a second substrate having, at one surface thereof facing the first substrate, a second oriented film, and a liquid crystal layer provided between the first substrate and the second substrate. When viewed in a normal line direction with respect to the first substrate in a plan view, the pixel electrode overlaps with an opening surrounded by a first light-shielding portion extending in the first direction and a second light-shielding portion extending in a second direction intersecting with the first direction. A width of the first light-shielding portion in the second direction is greater than a width of the second light-shielding portion in the first direction. In the opening, a size thereof in the second direction is smaller than a size thereof in the first direction. In the liquid crystal layer, liquid crystal molecules are pre-tilted by the first oriented film and the second oriented film, to allow an end on the second substrate in a long axis direction of the liquid crystal molecules to incline in an orientation intersecting with the first direction and the second direction with respect to an end on the first substrate in the long axis direction of the liquid crystal molecules. A center of the pixel electrode is shifted toward the orientation in a direction along the second direction from a center of the opening.

In the invention, the center of each of the pixel electrodes is shifted toward the side facing in the pre-tilt orientation along the second direction from the center of each of the openings. The width of each of regions in the second direction, in which the pixel electrodes respectively overlap with the first light-shielding portions in the pre-tilt orientation, is greater than a width of each of regions in the second direction, in which pixel electrodes respectively overlap with the first light-shielding portions in an orientation opposite to the pre-tilt orientation. Even if an orientation failure has occurred due to horizontal electric fields generated by adjacent ones of the pixel electrodes in the second direction, a degree of how many the orientation failure effects in the second direction with respect to corresponding ones of the openings can be reduced. The width of each of the first light-shielding portions in the second direction is greater than the width of each of the second light-shielding portions in the first direction. The width of each of the regions in the second direction, in which the pixel electrodes respectively overlap with the first light-shielding portions in the pre-tilt orientation, can be appropriately secured. A difference between a reduction in display quality due to horizontal electric fields generated by adjacent ones of the pixel electrodes in the first direction and a reduction in display quality due to horizontal electric fields generated by adjacent ones of the pixel electrodes in the second direction can therefore be reduced.

In the invention, such an aspect can be employed that a gap between the pixel electrode and a pixel electrode adjacent thereto in the second direction is greater than a gap between the pixel electrode and a pixel electrode adjacent thereto in the first direction. According to the aspect, horizontal electric fields generated by adjacent ones of the pixel electrodes in the second direction are negligible. A reduction in display quality due to horizontal electric fields generated by adjacent ones of the pixel electrodes in the second direction would therefore be less likely to occur.

In the invention, such an aspect can be employed that the first light-shielding portion includes a scanning line extending in the first direction at the one surface of the first substrate, and the second light-shielding portion includes a data line extending in the second direction at the one surface of the first substrate.

In the invention, such an aspect can be employed that the first light-shielding portion is provided with a contact hole through which the pixel electrode is electrically coupled to an electrode provided between the first substrate and the pixel electrode at a position overlapping with an end of the pixel electrode, the end being positioned on the orientation in the direction along the second direction.

In the invention, such an aspect can be employed that a plurality of the pixel electrodes are arranged in the first direction and the second direction, and a pitch in the first direction and a pitch in the second direction are identical to each other.

In the invention, such an aspect can be employed that the first oriented film and the second oriented film respectively are columnar structure objects inclined with respect to the first substrate and the second substrate.

In the invention, such an aspect can be employed that the liquid crystal molecules have negative dielectric anisotropy.

The electro-optical device according to an aspect of the present invention may be used for various electronic apparatuses.

BRIEF DESCRIPTION OF THE DRAWINGS

The invention will be described with reference to the accompanying drawings, wherein like numbers reference like elements.

DESCRIPTION OF EXEMPLARY EMBODIMENTS

An exemplary embodiment of the invention will now be described herein with reference to the accompanying drawings. The accompanying drawings to be referenced are appropriately scaled up or down or otherwise exaggerated to allow parts to be described in a fully recognizable manner. Other components than components needed to be described may sometimes be omitted. In addition, in the description below, the term "when viewed in a plan view" represents a state viewed from the normal direction with respect to a first substrate 10.

Configuration of Electro-Optical Device

Figure 1:
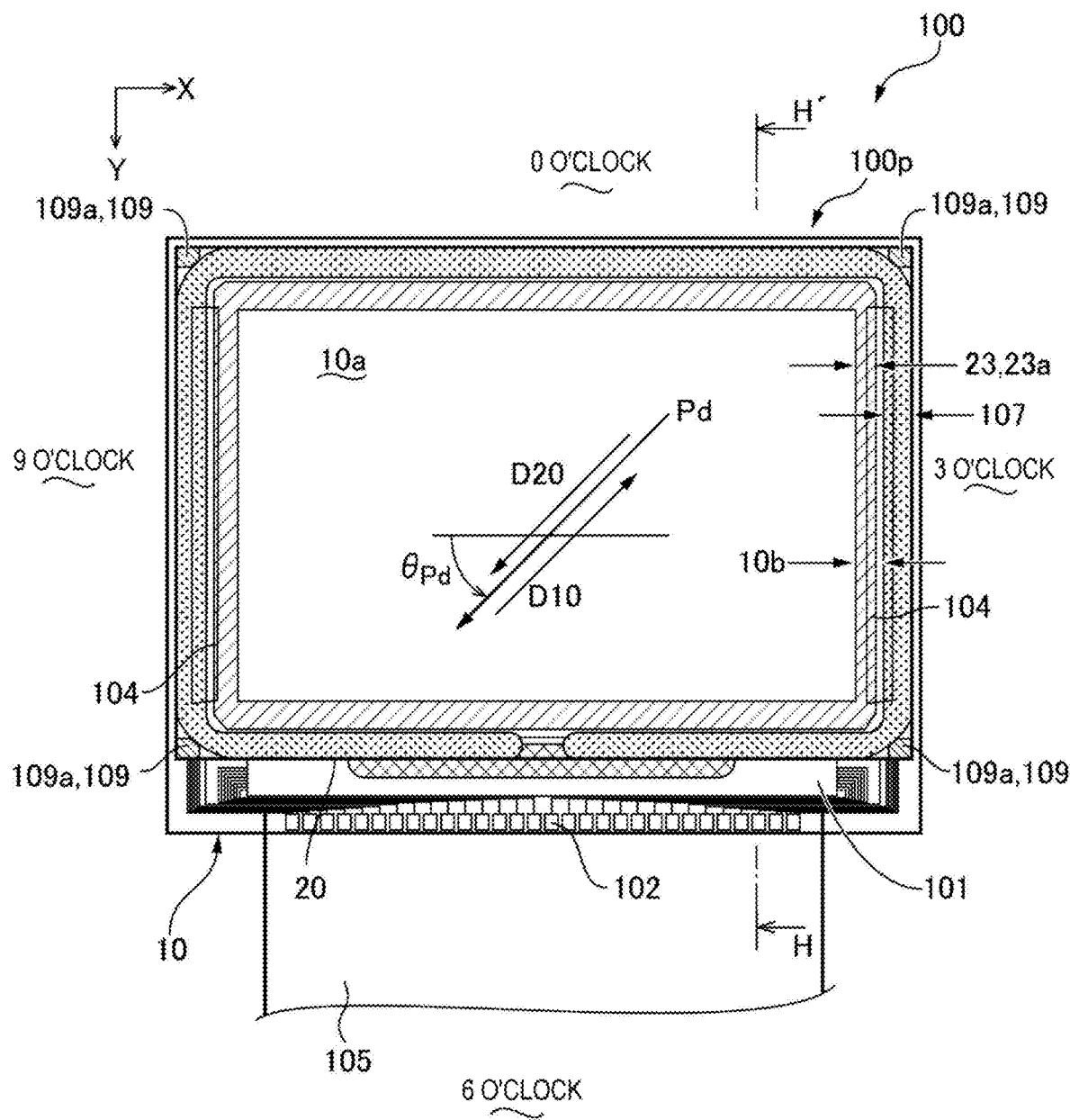
FIG. 1 is a plan view illustrating an electro-optical device to which an aspect of the invention is applied.
Figure 2:
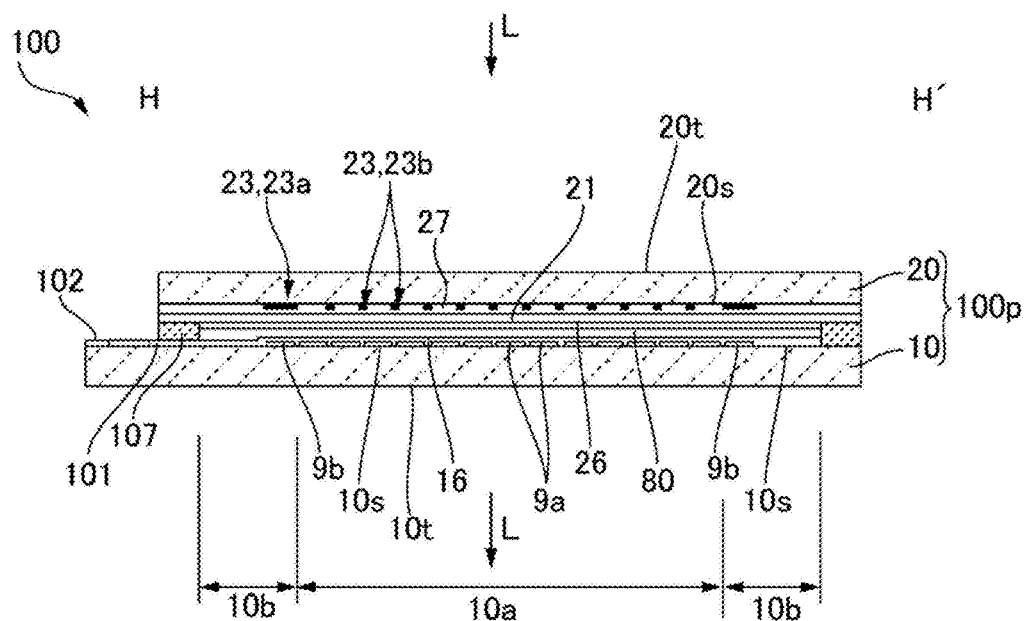
FIG. 2 is an H-H' cross-sectional view of the electro-optical device illustrated in FIG. 1.

FIG. 1 is a plan view illustrating an electro-optical device 100 to which an aspect of the invention is applied. The electro-optical device 100 is viewed from a second substrate 20. FIG. 2 is an H-H' cross-sectional view of the electro-optical device 100 illustrated in FIG. 1.

As illustrated in FIGS. 1 and 2, in the electro-optical device 100, the first substrate 10 and the second substrate 20 having translucency are laminated together via a sealing material 107 with a predetermined gap in between. The sealing material 107 is provided along an outer edge of the second substrate 20 to have a frame shape, and a liquid crystal layer 80 is arranged in a region surrounded by the sealing material 107 between the first substrate 10 and the second substrate 20.

The first substrate 10 and the second substrate 20 both have a quadrangle shape, and in a substantially center portion of the electro-optical device 100, a display region 10*a* is provided as a rectangular region where a size in a 0300-0900 o'clock direction (a size in a first direction X) is longer than a size in a 0000-0600 o'clock direction (a size in a second direction Y). In accordance with the above shapes, the sealing material 107 is also formed in a substantially rectangular shape, and a peripheral region 10*b* in a quadrangular frame-shape is provided between an inner peripheral edge of the sealing material 107 and an outer peripheral edge of the display region 10*a*.

A substrate main body of the first substrate 10 is made of quartz or glass, for example. The first substrate 10 has a surface (surface 10*s*) facing the second substrate 20. Outside of the display region 10*a* on the surface 10*s*, a data-line driving circuit 101 and a plurality of terminals 102 are formed along one side of the first substrate 10. The one side extends in the first direction X. Scanning-line driving circuits 104 are respectively further formed along two sides of the first substrate 10. The two sides extend in the second direction Y. A flexible wiring substrate 105 is coupled to the terminals 102. The first substrate 10 receives various potentials and various signals via the flexible wiring substrate 105.

The display region 10a on the surface 10s of the first substrate 10 is formed, in a matrix pattern, with a plurality of pixel electrodes 9a having translucency and made from an Indium Tin Oxide (ITO) film, for example, and pixel switching elements (not illustrated) respectively electrically coupled to the plurality of pixel electrodes 9a. A first orientation film 16 is formed on the second substrate 20 side with respect to the pixel electrodes 9a, and the pixel electrodes 9a are covered with the first orientation film 16.

A substrate main body of the second substrate 20 is made of quartz or glass, for example. The second substrate 20 has a surface (surface 20s) facing the first substrate 10. Adjacent to the surface 20s, a common electrode 21 having translucency and made from an ITO film, for example, is formed. A second oriented film 26 is formed adjacent to the first substrate 10 with respect to the common electrode 21. The common electrode 21 is therefore covered by the second oriented film 26. The common electrode 21 is formed substantially entirely on the second substrate 20. Opposite to the first substrate 10 with respect to the common electrode 21, a light-shielding layer 23 made of metal or a metal compound and having light-shielding properties and a protection layer 27 having translucency are formed. The light-shielding layer 23 is formed, for example, as a partition 23a in a frame shape extending along the outer peripheral edge of the display region 10a. The light-shielding layer 23 may be formed in a black matrix 23b in regions overlapping, when viewed in a plan view, with regions each between adjacent ones of the pixel electrodes 9a. In the exemplary embodiment, regions overlapping, when viewed in a plan view, with the partition 23a in the peripheral region 10b of the first substrate 10 are formed with dummy pixel electrodes 9b formed simultaneously with the pixel electrodes 9a.

The first substrate 10 includes inter-substrate conduction electrodes 109 being formed in regions positioning outside the sealing material 107 and overlapping with corner portions of the second substrate 20, so that electrical conduction is established between the first substrate 10 and the second substrate 20. Inter-substrate conduction materials 109a including conductive particles are arranged in the inter-substrate conduction electrodes 109. The common electrode 21 of the second substrate 20 is electrically coupled to the first substrate 10 via the inter-substrate conduction materials 109a and the inter-substrate conduction electrodes 109. Thus, a common potential is applied to the common electrode 21 from the first substrate 10.

The electro-optical device 100 according to the exemplary embodiment is configured as a transmissive-type electro-optical device. In the electro-optical device 100, as light enters into one of the first substrate 10 and the second substrate 20 and passes through the other one, the light is modulated. An image is thus displayed. In the exemplary embodiment, while light entered from the second substrate 20, as indicated by an arrow L in FIG. 2, passes through and exits from the first substrate 10, the light is modulated by the liquid crystal layer 80 for each of the pixels. An image is thus displayed.

Electrical Configuration of Electro-Optical Device 100

Figure 3:
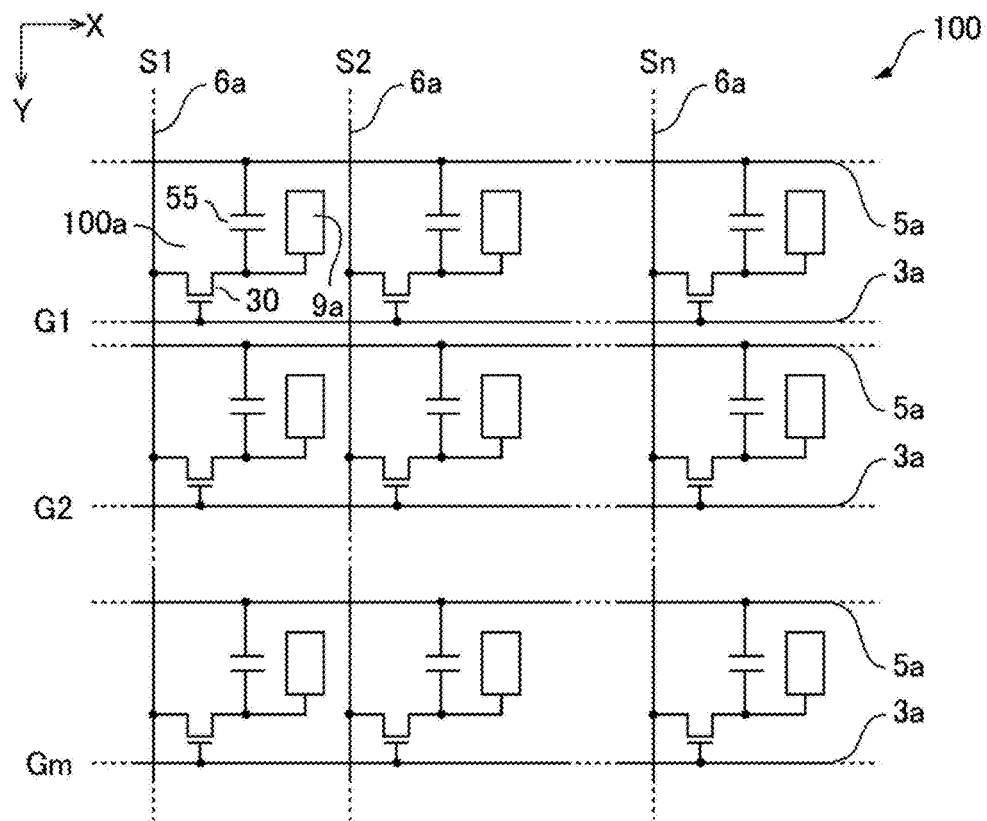
FIG. 3 is an explanatory diagram illustrating an electrical configuration of the electro-optical device illustrated in FIG. 1.

FIG. 3 is an explanatory diagram illustrating an electrical configuration of the electro-optical device 100 illustrated in FIG. 1. As illustrated in FIG. 3, in the display region 10a of the electro-optical device 100, for a plurality of pixels 100a formed in matrix, the pixel electrodes 9a and pixel switching elements 30 configured to drive the pixel electrode 9a are formed. Data lines 6a configured to supply image signals S1, S2, . . . Sn are electrically coupled to sources of the pixel switching elements 30. The image signals S1, S2, . . . Sn to be written in the data lines 6a may be sequentially supplied to the lines in the stated order, or may be supplied for each group including the plurality of data lines 6a that are adjacent to each other. Scanning lines 3a are electrically coupled to gates of the pixel switching elements 30, and configured that scanning signals G1, G2, . . . Gm are sequentially applied to the scanning lines 3a in a pulse in the stated order at a predetermined timing. The pixel electrodes 9a are electrically coupled to drains of the pixel switching elements 30, and write the image signals S1, S2, . . . Sn, which are supplied from the data lines 6a, in each of the pixels 100a at a predetermined timing by turning the pixel switching elements 30 into an ON-state for a certain time period. In this manner, the image signals S1, S2, . . . Sn that are written in the pixels 100a via the pixel electrodes 9a are retained for a certain time period together with the common electrode 21 of the second substrate 20 described with reference to FIG. 2. In the liquid crystal layer 80, orientation and order of molecular assembly are changed by a level of voltage to be applied, and accordingly, the liquid crystal layer 80 modulates the light and enables gradation display. Therefore, the light having contrast corresponding to the image signals S1, S2, . . . Sn exits from the electro-optical device 100.

Here, in some cases, in order to prevent the image signals S1, S2, . . . Sn retained for each of the pixels 100a from leaking, each retaining capacity 55 may be added in parallel with liquid crystal capacity formed between each of the pixel electrodes 9a and the common electrode 21 by using capacitance lines 5a. In this case, the voltage of each of the pixel electrodes 9a is retained by the retaining capacity 55 for a time period longer than a time period for which the source voltage is applied. With this, a charge retention property is improved, and the electro-optical device 100 of an active matrix type with a high contrast ratio can be achieved.

Configuration of Liquid Crystal Layer 80 and Other Components

Figure 4:
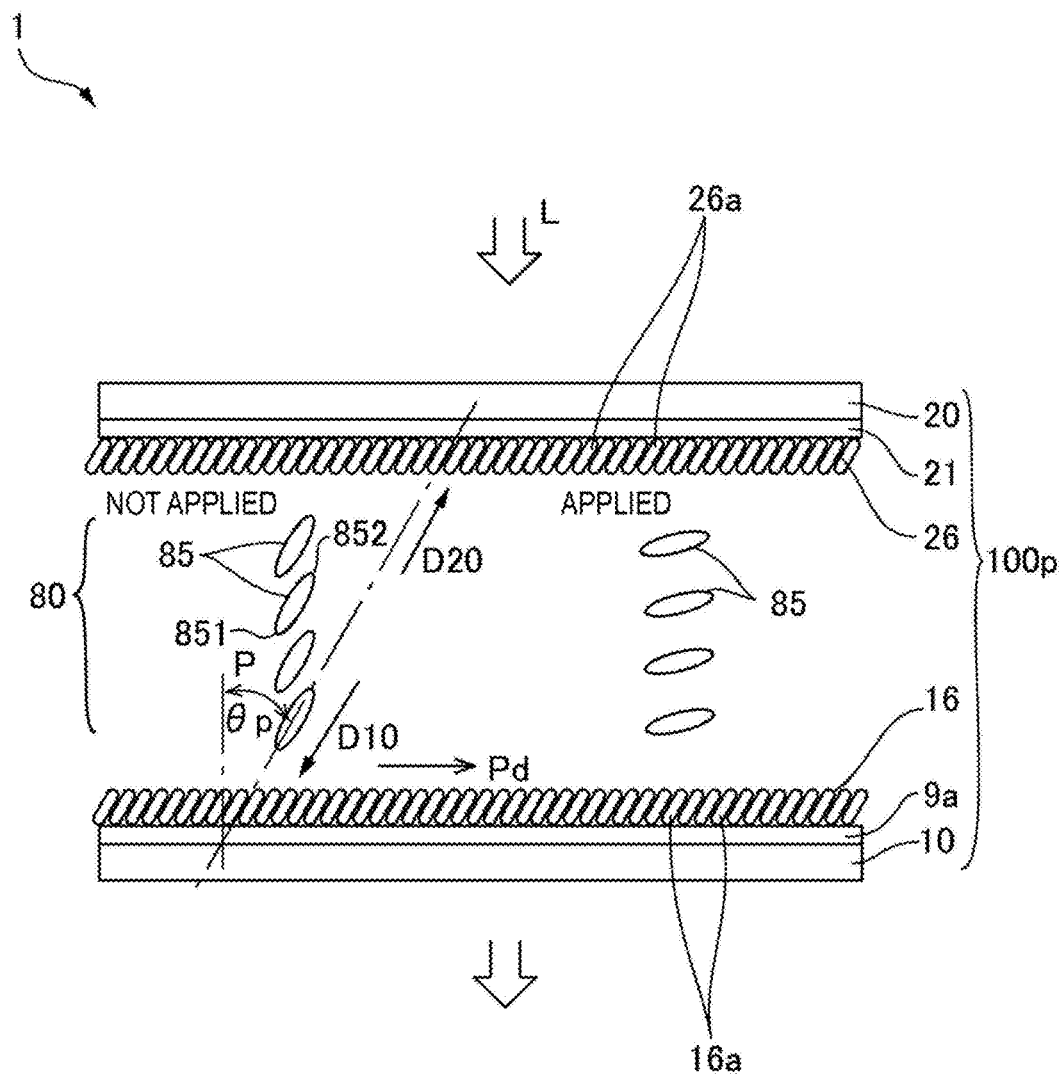
FIG. 4 is an explanatory view of liquid crystal molecules, for example, used in the electro-optical device illustrated in FIG. 1.

FIG. 4 is an explanatory view of liquid crystal molecules 85, for example, used in the electro-optical device 100 illustrated in FIG. 1. The first oriented film 16 and the second oriented film 26 illustrated in FIG. 2 are each made from a polyimide film or an inorganic oriented film. In the exemplary embodiment, the first oriented film 16 and the second oriented film 26 are oblique deposition films (inorganic oriented films) made of $SiO_x$ (x<2), $SiO_2$, $TiO_2$, MgO, or $Al_2O_3$, for example.

Therefore, as illustrated in FIG. 4, the first oriented film 16 and the second oriented film 26 respectively have columnar structure objects having columnar bodies 16a and 26a referred to as columns respectively formed diagonally with respect to the first substrate 10 and the second substrate 20. Thus, in the first oriented film 16 and the second oriented film 26, the liquid crystal molecules 85 having negative dielectric anisotropy and used in the liquid crystal layer 80 are oriented diagonally with respect to the first substrate 10 and the second substrate 20 to allow the liquid crystal molecules 85 to be pre-tilted. While no voltage is applied between each of the pixel electrodes 9a and the common electrode 21, a pre-tilt angle θp denotes an angle formed between a vertical direction with respect to the first substrate 10 and the second substrate 20 and a long axis direction (orientation direction) of the liquid crystal molecules 85. The pre-tilt angle θp substantially ranges from 3° to 5°, for example.

A pre-tilt orientation Pd of the liquid crystal molecules 85 represents an orientation in which an end 852, adjacent to the second substrate 20, of each of the liquid crystal molecules 85 in the long axis direction faces with respect to an end 851, adjacent to the first substrate 10, of each of the liquid crystal molecules 85. In the electro-optical device 100, when a drive voltage is applied between each of the pixel electrodes 9a and the common electrode 21, the liquid crystal molecules 85 incline in the pre-tilt orientation Pd.

In this way, the electro-optical device 100 is configured as an electro-optical device employing a vertical alignment (VA) mode. The electro-optical device 100 is disposed between the pair of polarized light elements disposed in a crossed Nichol manner to allow the pre-tilt orientation Pd to form an angle of 45° with respect to a transmission axis or an absorption axis of the pair of polarized light elements. Transmittance of incident light therefore increases in accordance with a voltage applied between each of the pixel electrodes 9a and the common electrode 21 for each of the pixels. An image is displayed in the normally black mode where the pixels in the electro-optical device 100 wholly emit light at a degree of contrast in accordance with an image signal.

In the exemplary embodiment, as illustrated in FIG. 1, a deposition direction D10 representing an orientation when the first oriented film 16 is formed heads from 0730 o'clock to 0130 o'clock. At that time, a direction in which the columnar bodies 16a grow heads from 0130 o'clock to 0730 o'clock. A deposition direction D20 representing an orientation when the second oriented film 26 is formed heads from 0130 o'clock to 0730 o'clock. At that time, a direction in which the columnar bodies 26a grow heads from 0730 o'clock to 0130 o'clock. Therefore, the pre-tilt orientation Pd of the liquid crystal molecules 85 heads from 0130 o'clock to 0730 o'clock. The pre-tilt orientation Pd intersects with the first direction X and the second direction Y, respectively, at an angle of 45°.

Specific Configuration of Pixel

Figure 5:
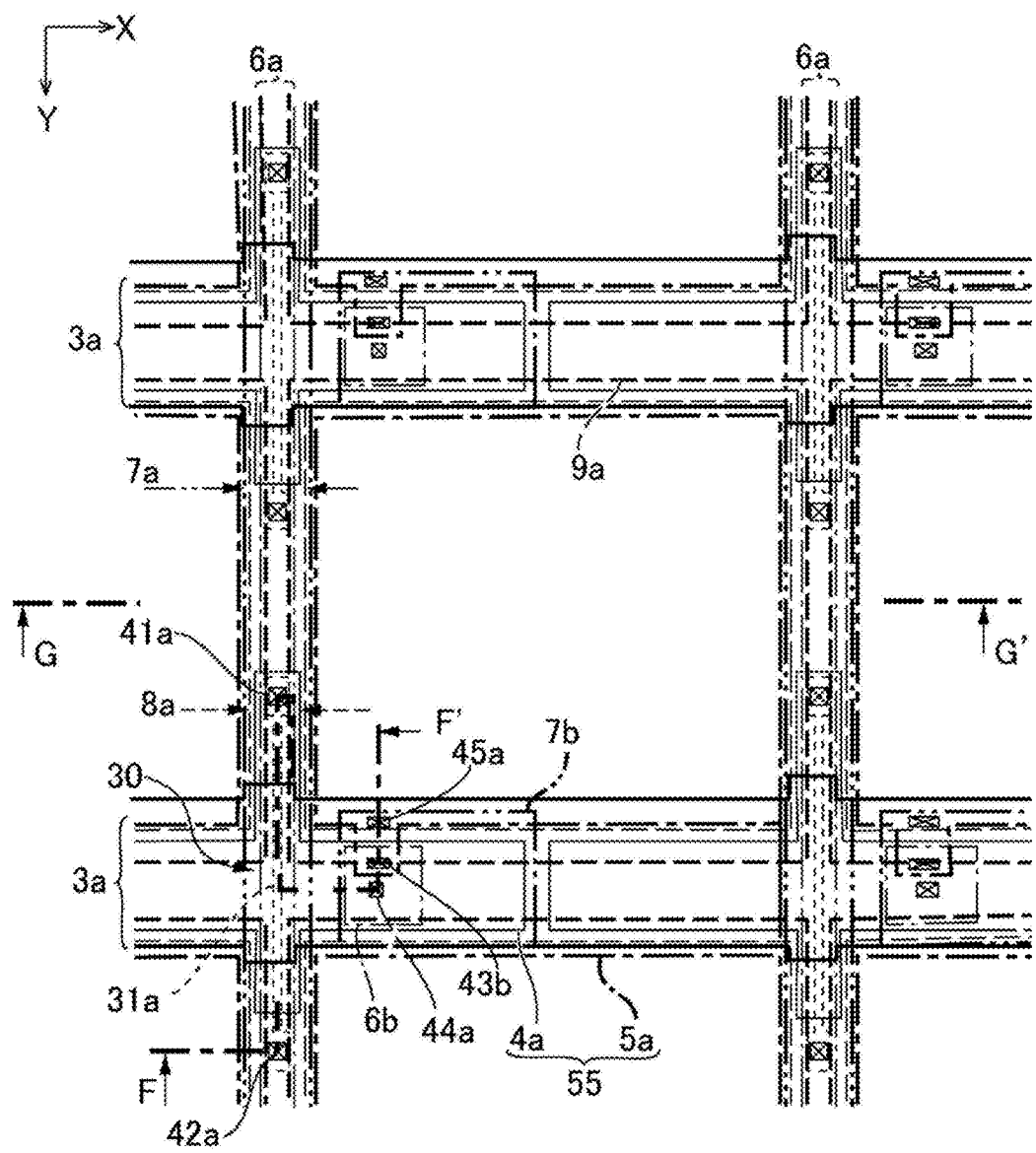
FIG. 5 is a plan view of a plurality of pixels adjacent to each other in the electro-optical device illustrated in FIG. 1.
Figure 6:
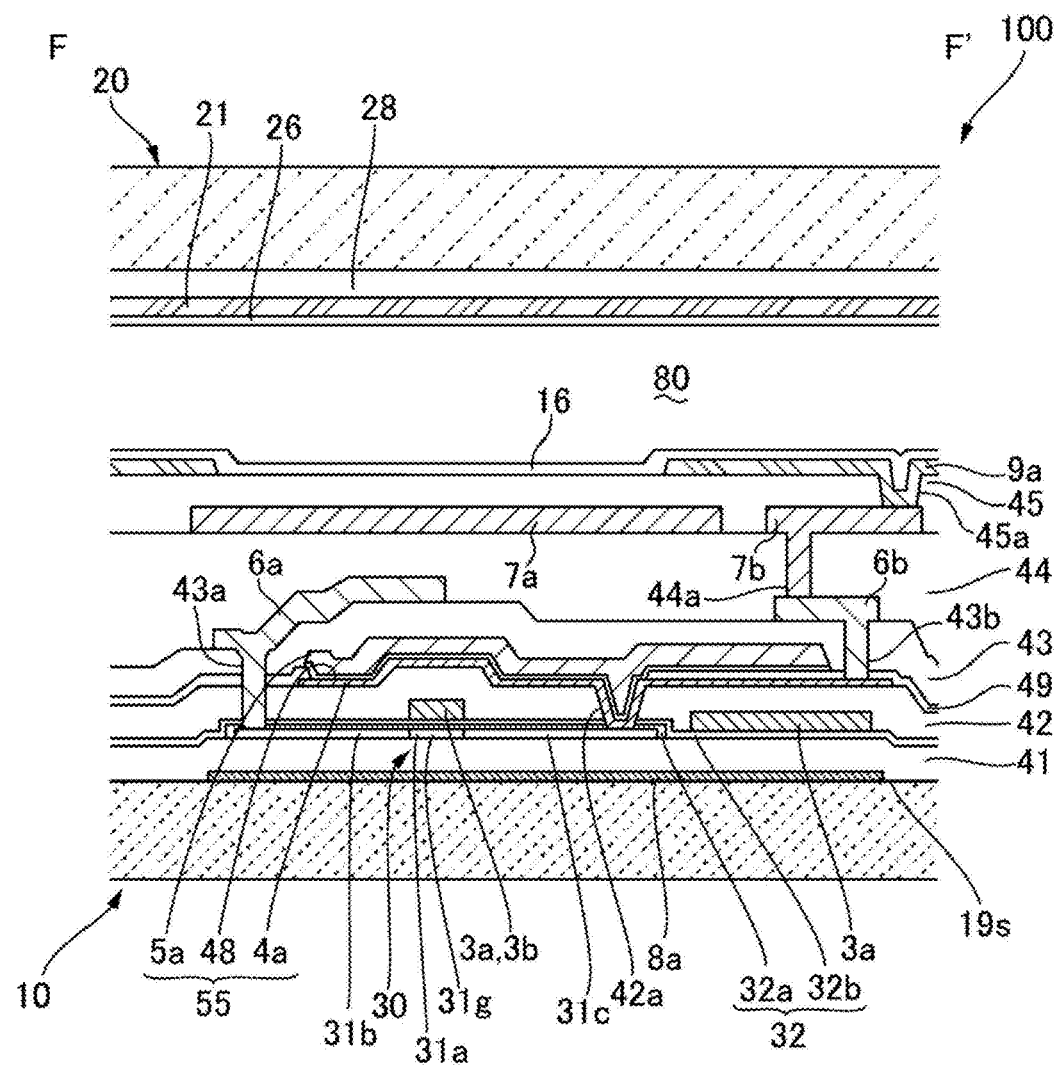
FIG. 6 is an F-F' cross-sectional view of the electro-optical device illustrated in FIG. 1.

FIG. 5 is a plan view of the plurality of pixels adjacent to each other in the electro-optical device 100 illustrated in FIG. 1. FIG. 6 is an F-F' cross-sectional view of the electro-optical device 100 illustrated in FIG. 1. Note that, in FIG. 5, each layer is indicated by a line as described below. Further, as for the layers that have ends overlapping with each other in plan view, the positions of the ends are deviated in FIG. 5 for easy understanding of shapes and the like of the layers.

The first light shielding layer 8a: the thin and long dashed line

The semiconductor layer 31a: the thin and short dotted line

The scanning line 3a: the thick solid line

The drain electrode 4a: the thin solid line

The data line 6a and the relay electrode 6b: the thin long dashed short dashed line The capacitance line 5a: the thick long dashed short dashed line The second light shielding layer 7a and the relay electrode 7b: the thick long dashed double-short dashed line The pixel electrode 9a: the thick dashed line As illustrated in FIG. 5, the surface 10s of the first substrate 10 is formed with the plurality of pixel electrodes 9a, and the data lines 6a and the scanning lines 3a are formed along inter-pixel regions sandwiched by the pixel electrodes 9a adjacent to each other. The inter-pixel regions extend lengthwise and crosswise. The scanning lines 3a linearly extend along first inter-pixel regions of the inter-pixel regions, which extend in the first direction X, and the data lines 6a linearly extend along second inter-pixel regions of the inter-pixel regions, which extend in the second direction Y. Further, the pixel switching elements 30 and the pixel electrodes 9a are formed to correspond to intersections between the data lines 6a and the scanning lines 3a, and the pixel switching elements 30 are formed by using intersection regions between the data lines 6a and the scanning lines 3a and the vicinities of the intersection regions. The capacitance lines 5a are formed on the first substrate 10, and a common potential Vcom is applied to the capacitance lines 5a. The capacitance lines 5a extend to overlap with the scanning lines 3a and the data lines 6a, and are formed to have a lattice shape. On an upper layer of the pixel switching element 30, the second light shielding layer 7a is formed, and the second light shielding layer 7a extends to overlap with the data lines 6a and the scanning lines 3a. On a lower layer of the pixel switching element 30, the first light shielding layer 8a is formed, and the first light shielding layer 8a extends to overlap with the scanning lines 3a and the data lines 6a.

Narrowing pixel pitches to achieve finer pixels and shrunk substrates in size would lead to a difference in width between each of the first inter-pixel regions extending in the first direction X and each of the second inter-pixel regions extending in the second direction Y in the light-shielding regions for arranging wires, capacitors, pixel transistors, and contacts, for example, as illustrated in FIG. 5, requiring openings to each have a heteromorphic shape (rectangle) to prevent an aperture ratio from lowering. For example, to achieve a narrower pixel pitch of 6 μm or greater in a high-temperature polysilicon TFT liquid crystal panel employed in a liquid crystal projector, a width of each of the first inter-pixel regions extending in the first direction X and arranged with contact holes 45a becomes greater than a width of each of the second inter-pixel regions extending in the second direction Y in light-shielding regions for arranging wires, capacitors, pixel transistors, and contacts, for example. To prevent an aperture ratio from lowering at this time, openings are required to each be shaped into a rectangle extending in the first direction X.

As illustrated in FIG. 6, the surface 10s of the first substrate 10 is formed with the first light shielding layer 8a including a conductive film such as a conductive polysilicon film, a metal silicide film, a metal film, or a metal compound film. The first light shielding layer 8a includes, for example, a light shielding film of tungsten silicide (WSi), tungsten, or titanium nitride, and prevents the light from entering the semiconductor layer 31a and causing an erroneous operation in the pixel switching element 30 due to photoelectric current. The first light shielding layer 8a may be configured as a scanning line. In this case, the following configuration to be described later is obtained. That is, the gate electrode 3b and the first light shielding layer 8a are brought into conduction with each other.

On the first substrate 10, on an upper layer of the first light shielding layer 8a, a transmissive inter-layer insulating film 41 including, for example, a silicon oxide film is formed. On an upper layer of the inter-layer insulating film 41, the pixel switching element 30 including the semiconductor layer 31a is formed. The pixel switching element 30 is a Thin Film Transistor (TFT), which includes the semiconductor layer 31a and the gate electrode 3b. The semiconductor layer 31a has long sides oriented in an extending direction of the data line 6a. The gate electrode 3b extends in a direction orthogonal to the longitudinal direction of the semiconductor layer 31a, and overlaps with a central part of the semiconductor layer 31a in the longitudinal direction. In the exemplary embodiment, the gate electrode 3b includes a part of the scanning line 3a. The pixel switching element 30 includes a transmissive gate insulating layer 32 between the semiconductor layer 31a and the gate electrode 3b. The semiconductor layer 31a includes a channel region 31g facing the gate electrode 3b via the gate insulating layer 32, and also includes a source region 31b and a drain region 31c on one side and the other side of the channel region 31g, respectively. The pixel switching element 30 has an LDD structure. Thus, on both the sides of the channel region 31g, each of the source region 31b and the drain region 31c has a low-concentration region. In a region adjacent to a side opposite to the channel region 31g with respect to the low-concentration region, each of the source region 31b and the drain region 31c has a high-concentration region.

The semiconductor layer 31a includes, for example, a polysilicon film (polycrystalline silicon film). The gate insulating layer 32 has a two-layer structure including a first gate insulating layer 32a including a silicon oxide film that is obtained by thermally oxidizing the semiconductor layer 31a, and a second gate insulating layer 32b including a silicon oxide film that is formed by using, for example, the low pressure CVD method. The gate electrode 3b and the scanning line 3a include a conductive film such as a conductive polysilicon film, a metal silicide film, a metal film, or a metal compound film.

On an upper layer of the gate electrode 3b, a transmissive inter-layer insulating film 42 including, for example, a silicon oxide film is formed. On an upper layer of the inter-layer insulating film 42, a drain electrode 4a is formed. The drain electrode 4a includes a conductive film such as a conductive polysilicon film, a metal silicide film, a metal film, or a metal compound film. The drain electrode 4a is formed to have a part overlapping with the drain region 31c of the semiconductor layer 31a, and is brought into conduction with the drain region 31c via a contact hole 42a passing through the inter-layer insulating film 42 and the gate insulating layer 32.

On an upper layer of the drain electrode 4a, a transmissive etching stopper layer 49 including, for example, a silicon oxide film and a transmissive dielectric layer 48 are formed. On an upper layer of the dielectric layer 48, the capacitance line 5a is formed. As the dielectric layer 48, a silicon compound such as a silicon oxide film or a silicon nitride film may be used. In addition, a dielectric layer having a high dielectric constant, such as an aluminum oxide film, a titanium oxide film, a tantalum oxide film, a niobium oxide film, a hafnium oxide film, a lantern oxide film, or a zirconium oxide film may be used. The capacitance line 5a is formed of a conductive film such as a conductive polysilicon film, a metal silicide film, a metal film, and a metal compound film. The capacitance line 5a overlaps with the drain electrode 4a via the dielectric layer 48, and forms the retaining capacity 55.

On an upper layer of the capacitance line 5a, a transmissive inter-layer insulating film 43 including, for example, a silicon oxide film is formed. On an upper layer of the inter-layer insulating film 43, the data line 6a and the relay electrode 6b are formed of the same conductive film. The data line 6a and the relay electrode 6b include a conductive film such as a conductive polysilicon film, a metal silicide film, a metal film, or a metal compound film. The data line 6a is brought into conduction with the source region 31b via a contact hole 43a passing through the inter-layer insulating film 43, the etching stopper layer 49, the inter-layer insulating film 42, and the gate insulating layer 32. The relay electrode 6b is brought into conduction with the drain electrode 4a via a contact hole 43b passing through the inter-layer insulating film 43 and the etching stopper layer 49.

On an upper layer of the data line 6a and the relay electrode 6b, a transmissive inter-layer insulating film 44 including, for example, a silicon oxide film is formed. On an upper layer of the inter-layer insulating film 44, the second light shielding layer 7a and the relay electrode 7b are formed of the same conductive film. The inter-layer insulating film 44 has a flattened surface. The second light shielding layer 7a and the relay electrode 7b include a conductive film such as a conductive polysilicon film, a metal silicide film, a metal film, or a metal compound film. The relay electrode 7b is brought into conduction with the relay electrode 6b via a contact hole 44a passing through the inter-layer insulating film 44. The second light shielding layer 7a extends to overlap with the data line 6a. Note that, the second light shielding layer 7a may be brought into conduction with the capacitance line 5a and used as a shielding layer.

On an upper layer of the second light shielding layer 7a and the relay electrode 7b, a transmissive inter-layer insulating film 45 including, for example, a silicon oxide film is formed. On an upper layer of the inter-layer insulating film 45, the pixel electrode 9a including an ITO film is formed. The contact hole 45a reaching the relay electrode 7b is formed in the inter-layer insulating film 45. The pixel electrode 9a is electrically coupled to the relay electrode 7b via the contact hole 45a. As a result, the pixel electrode 9a is electrically coupled to the drain region 31c via the relay electrode 7b, the relay electrode 6b, and the drain electrode 4a. The inter-layer insulating film 45 has a flattened surface. The first oriented film 16 is formed on surfaces of the pixel electrodes 9a.

Layout and Other Details of Pixel Electrodes 9a

Figure 7:
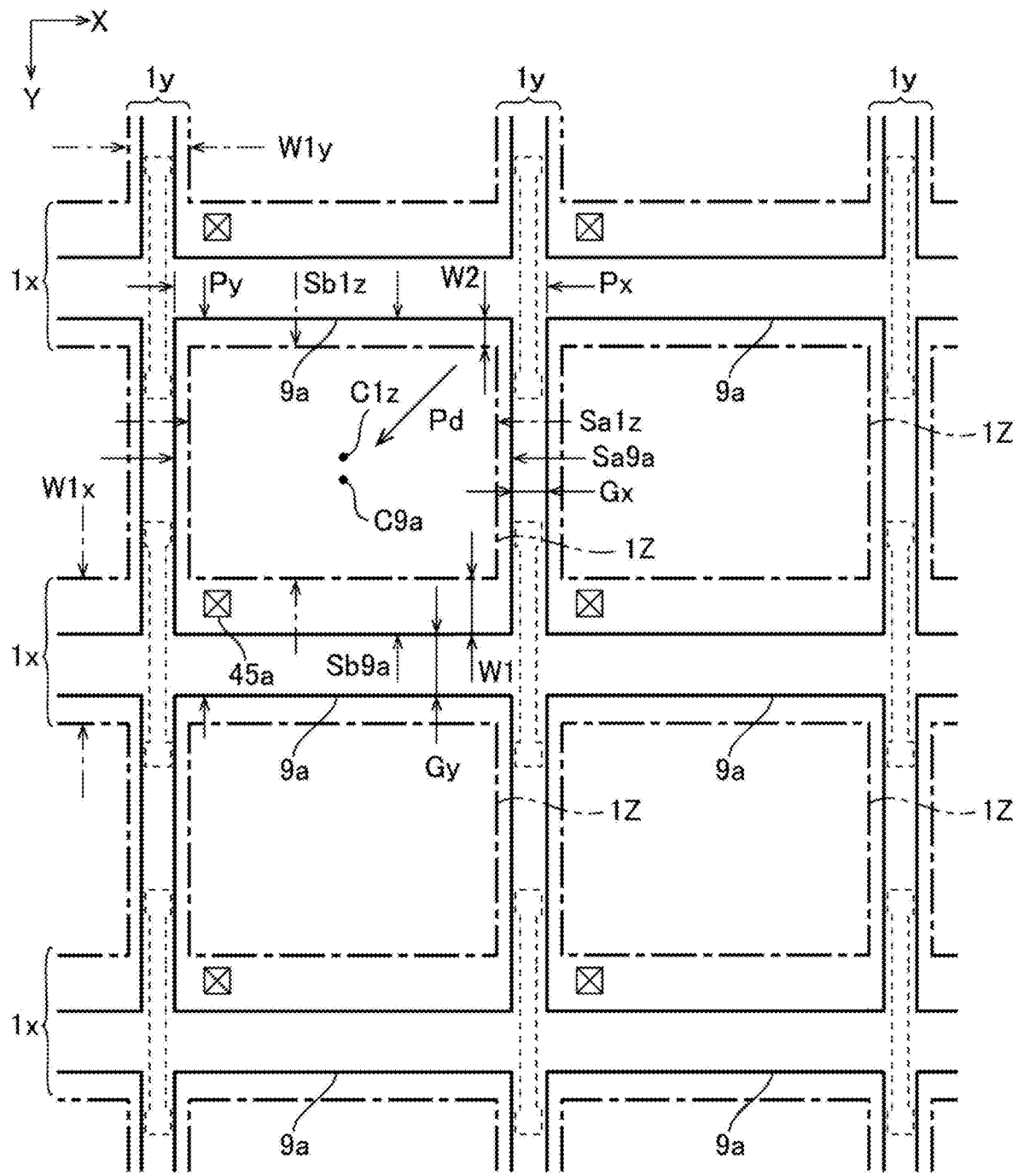
FIG. 7 is an explanatory view illustrating a planar layout, for example, of pixel electrodes illustrated in FIG. 5.

FIG. 7 is an explanatory view illustrating a planar layout, for example, of the pixel electrodes 9a illustrated in FIG. 5. As illustrated in FIG. 7, in the electro-optical device 100 according to the exemplary embodiment, openings 1z are defined by transmissive portions surrounded by a plurality of first light-shielding portions 1x extending in the first direction X and a plurality of second light-shielding portions 1y extending in the second direction Y. The plurality of pixel electrodes 9a respectively overlap with a plurality of the openings 1z. The first light-shielding portions 1x include portions extending in the first direction X on the first light-shielding layer 8a described with reference to FIGS. 2, 5, and 6, the scanning lines 3a extending in the first direction X, portions extending in the first direction X on the capacitance lines 5a, portions extending in the first direction X on the second light-shielding layer 7a, and portions extending in the first direction X on the black matrix 23b. The second light-shielding portions 1y include portions extending in the second direction Y on the first light-shielding layer 8a described with reference to FIGS. 2, 5, and 6, portions extending in the second direction Y on the capacitance lines 5a, the data lines 6a extending in the second direction Y, portions extending in the second direction Y on the second light-shielding layer 7a, and portions extending in the second direction Y on the black matrix 23b.

A width W1x in the second direction Y of each of the plurality of first light-shielding portions 1x is greater than a width w1y in the first direction X of each of the plurality of second light-shielding portions 1y. In each of the plurality of openings 1z, a size Sb1z in the second direction Y is smaller than a size Sa1z in the first direction X. Corresponding to the shape of each of the openings 1z, in each of the plurality of pixel electrodes 9a, a size Sb9a in the second direction Y is smaller than a size Sa9a in the first direction X. However, in each of the plurality of pixel electrodes 9a and each of the plurality of openings, a pitch Px in the first direction X and a pitch Py in the second direction Y are identical to each other.

In the exemplary embodiment, the pre-tilt orientation Pd of the liquid crystal molecules 85 heads from 0130 o'clock to 0730 o'clock. The plurality of first light-shielding portions 1x are provided with the contact holes 45a used to electrically couple the pixel electrodes 9a to electrodes provided between the first substrate 10 and the pixel electrodes 9a (the relay electrodes 7b illustrated in FIG. 6) at positions overlapping with ends of the plurality of pixel electrodes 9a. The ends face in the pre-tilt orientation Pd in a direction along the second direction Y.

In the electro-optical device 100 configured as described above, a center C9a of each of the pixel electrodes 9a is shifted toward a side facing in the pre-tilt orientation Pd along the second direction Y with respect to a center C1z of the openings 1z. In the second direction Y, a width W1 in the second direction Y of each of regions in which the pixel electrodes 9a overlap with the first light-shielding portions 1x on a side facing in the pre-tilt orientation Pd is therefore greater than a width W2 in the second direction Y of each of regions in which the pixel electrodes 9a overlap with the first light-shielding portions 1x on an opposite facing in the pre-tilt orientation Pd. In each of the plurality of pixel electrodes 9a, a gap Gy in the second direction Y is greater than a gap Gx in the first direction X.

In a direction along the first direction X, the center C9a of each of the pixel electrodes 9a is not shifted from the center C1z of each of the openings 1z. In the first direction X, a width in the first direction X of each of regions in which the pixel electrodes 9a overlap with the second light-shielding portions 1y on the side facing in the pre-tilt orientation Pd is therefore identical to a width in the first direction X of each of regions in which the pixel electrodes 9a overlap with the second light-shielding portions 1y on the opposite facing in the pre-tilt orientation Pd, and is smaller than the widths W1 and W2.

In the exemplary embodiment, the width W1x of each of the first light-shielding portions 1x is 2 μm. The width W1y of each of the second light-shielding portions 1y is 1 μm. The gap Gy between the pixel electrodes 9a is 1 μm. The gap Gx is 0.6 μm.

Main Effects of the Exemplary Embodiment

Figure 8:
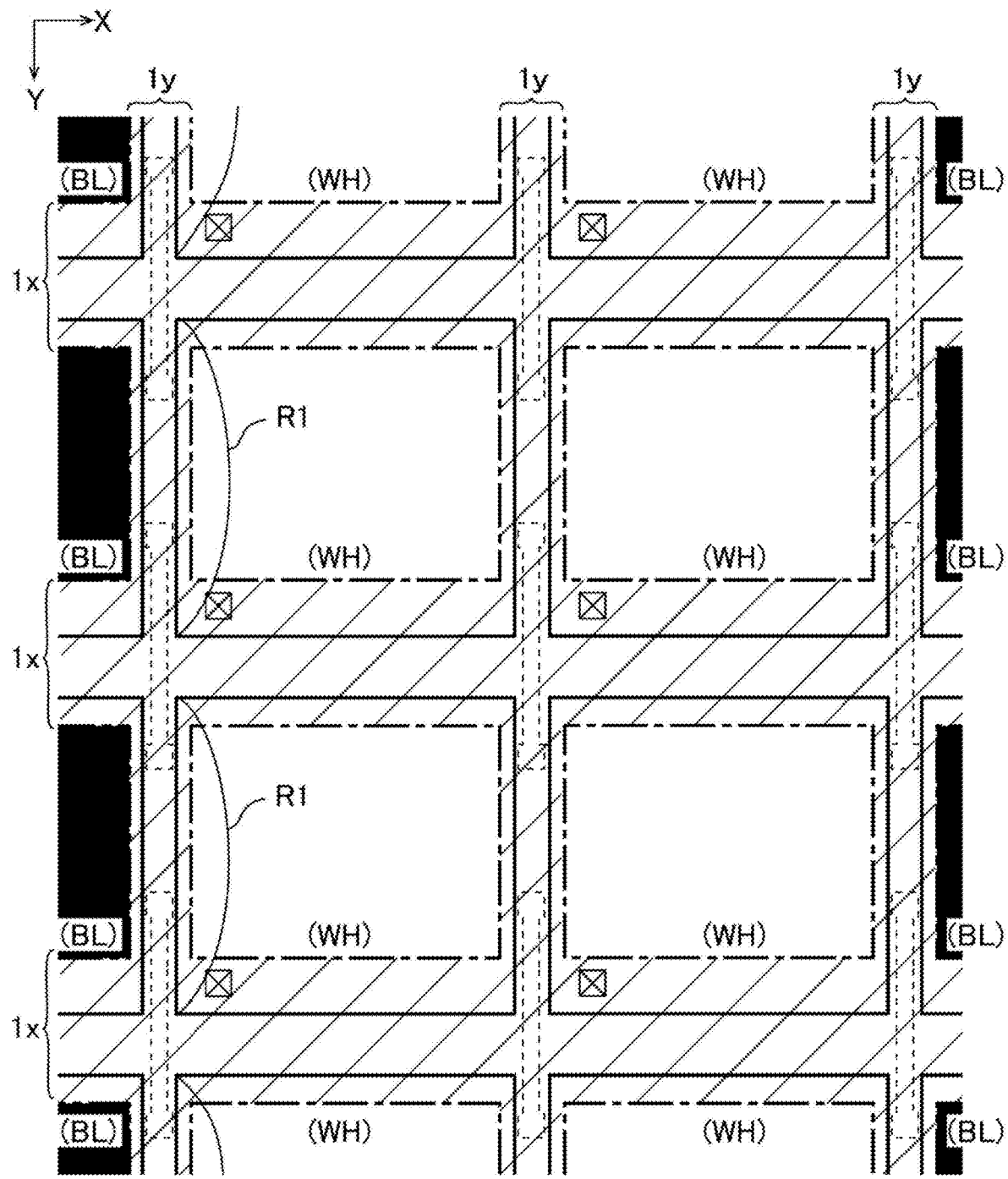
FIG. 8 is an explanatory view when black lines extending in a second direction are displayed in the electro-optical device to which the invention is applied.
Figure 9:
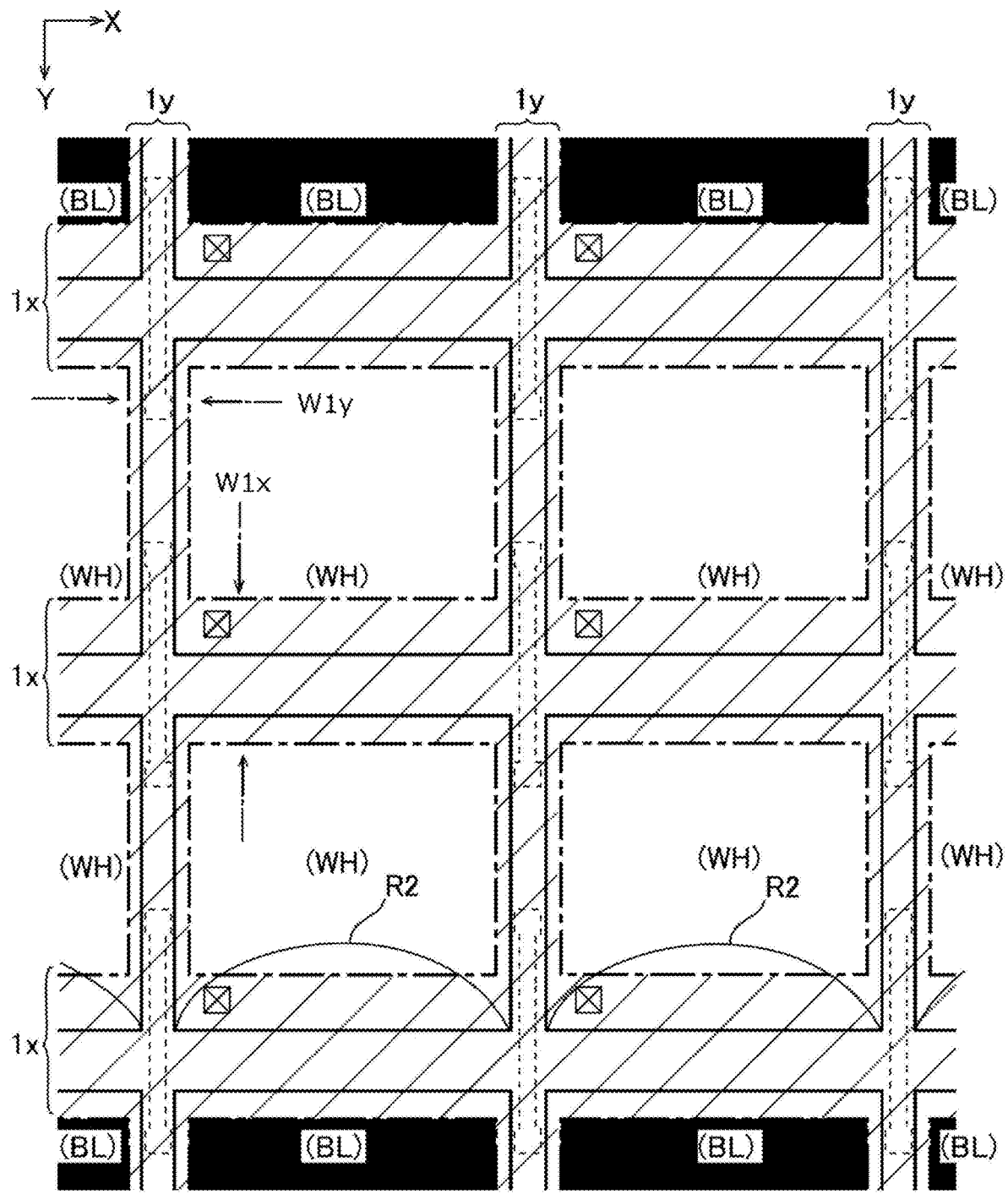
FIG. 9 is an explanatory view when black lines extending in a first direction are displayed in the electro-optical device to which the invention is applied.

FIG. 8 is an explanatory view when black lines extending in the second direction Y are displayed in the electro-optical device 100 to which the invention is applied. FIG. 9 is an explanatory view when black lines extending in the first direction X are displayed in the electro-optical device 100 to which the invention is applied.

As illustrated in FIG. 8, for example, when black lines extending in the second direction Y (longitudinal direction) are displayed on a white background, inappropriate orientation regions R1 in which horizontal electric fields generated by the pixel electrodes 9a in the pixels for black display (BL) damage orientations of the liquid crystal molecules appear on sides facing in the pre-tilt orientation Pd in the pixels for white display (WH) adjacent to the pixels for black display (BL).

As illustrated in FIG. 9, for example, when black lines extending in the first direction X (lateral direction) are displayed on a white background, inappropriate orientation regions R2 in which horizontal electric fields generated by the pixel electrodes 9a in the pixels for black display (BL) damage orientations of the liquid crystal molecules appear on sides facing in the pre-tilt orientation Pd in the pixels for white display (WH) adjacent to the pixels for black display (BL).

At that time, in a comparative example described later with reference to FIGS. 10, 11, and 12, when a size in the second direction Y is smaller than a size in the first direction X in each of the openings 1z, a degree of reduction in display quality due to a reduction in brightness in a case when horizontal electric fields are generated in the second direction Y is greater than a degree of reduction in display quality due to a reduction in brightness in a case when horizontal electric fields are generated in the first direction X. In the exemplary embodiment, as described with reference to FIG. 7, the center C9a of each of the pixel electrodes 9a is shifted toward the side facing in the pre-tilt orientation Pd along the second direction Y in which the openings 1z are smaller in size with respect to the center C1z of each of the openings 1z. The width W1 in the second direction Y of each of the regions in which the pixel electrodes 9a overlap with the first light-shielding portions 1x on the side facing in the pre-tilt orientation Pd is therefore greater than the width W2 in the second direction Y of each of the regions in which the pixel electrodes 9a overlap with the first light-shielding portions 1x on the side facing in the opposite orientation to the pre-tilt orientation Pd. For example, as illustrated in FIG. 9, when the black lines extending in the first direction X (lateral direction) are displayed on the white background, even when horizontal electric fields generated by the adjacent ones of the pixel electrodes 9a in the second direction Y have caused an orientation failure to occur, a degree of how many the inappropriate orientation regions R2 expand in the second direction Y with respect to corresponding ones of the openings 1z can therefore be reduced. The width W1x of each of the first light-shielding portions 1x in the second direction Y is greater than the width W1y of each of the second light-shielding portions 1y in the first direction X. The width W1 of each of the regions in the second direction Y, in which the pixel electrodes 9a overlap with the first light-shielding portions 1x in the pre-tilt orientation Pd, can be appropriately secured. A difference between a reduction in display quality due to horizontal electric fields generated by adjacent ones of the pixel electrodes 9a in the first direction X and a reduction in display quality due to horizontal electric fields generated by adjacent ones of the pixel electrodes 9a in the second direction Y can therefore be reduced.

In each of the plurality of pixel electrodes 9a, the gap Wy in the second direction Y is greater than the gap Wx in the first direction X. For example, as illustrated in FIG. 9, when the black lines extending in the first direction X (lateral direction) are displayed on the white background, horizontal electric fields generated by adjacent ones of the pixel electrodes 9a in the second direction Y are negligible. A reduction in display quality due to horizontal electric fields generated by the adjacent ones of the pixel electrodes 9a in the second direction Y would therefore be less likely to occur. A difference between a reduction in display quality due to horizontal electric fields generated by adjacent ones of the pixel electrodes 9a in the first direction X and a reduction in display quality due to horizontal electric fields generated by adjacent ones of the pixel electrodes 9a in the second direction Y can therefore be reduced.

In the exemplary embodiment, the first light-shielding portions 1x are respectively provided with the contact holes 45a used to electrically couple the pixel electrodes 9a to the relay electrodes 7b at positions overlapping with the ends of the pixel electrodes 9a. The ends face in the pre-tilt orientation Pd in a direction along the second direction Y. That is, the contact holes 45a are provided to sides having wider widths in the second direction Y of the regions in which the pixel electrodes 9a overlap with the first light-shielding portions 1x. Spaces for providing the contact holes 45a on the first light-shielding portions 1x can therefore be easily secured.

Comparative Example

Figure 10A:
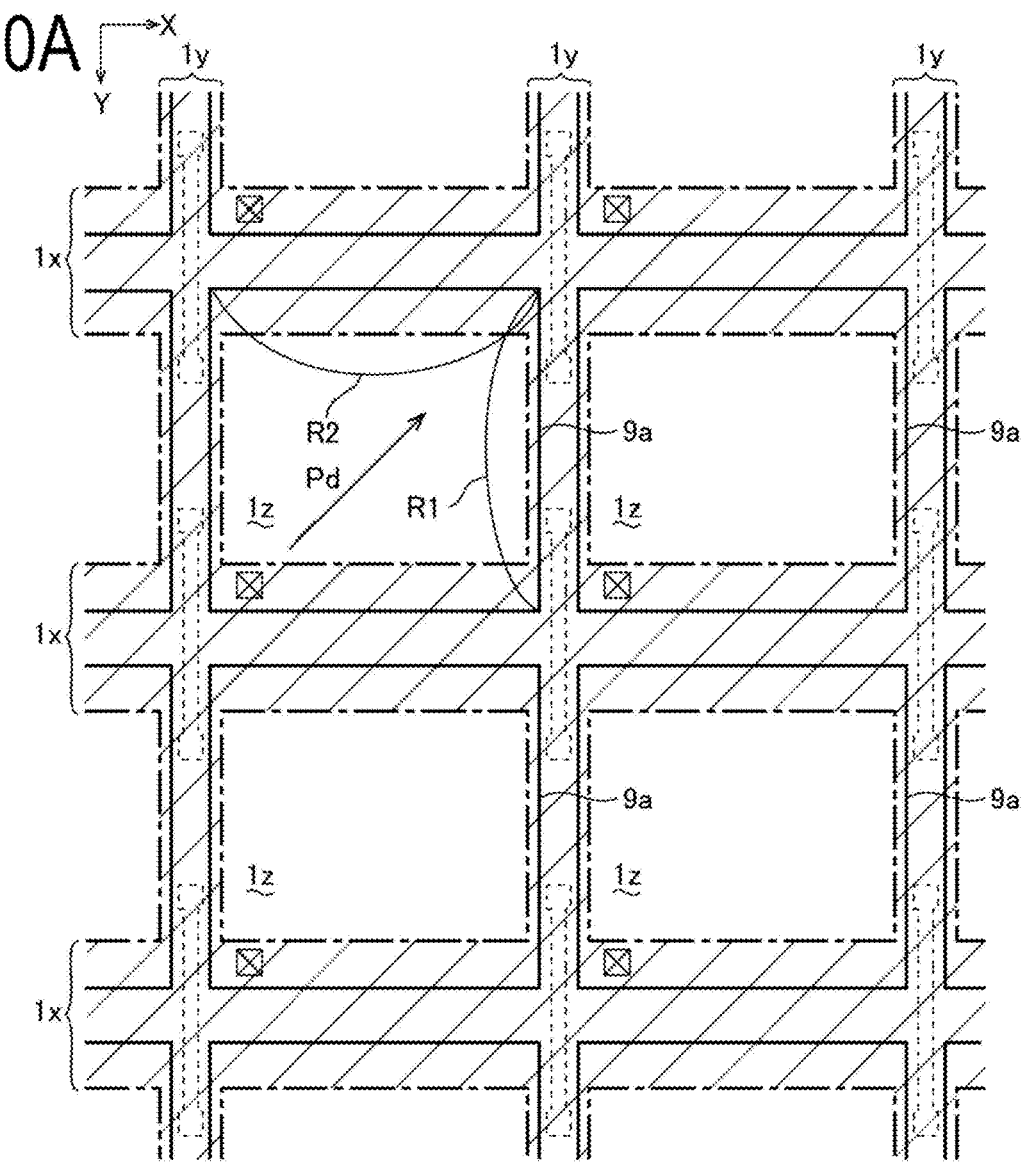
FIGS. 10A and 10B are explanatory views of an electro-optical device according to a comparative example.
Figure 10B:
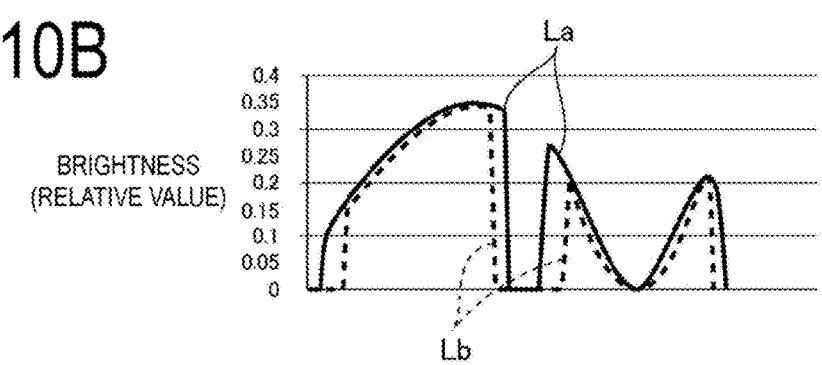
Figure 11:
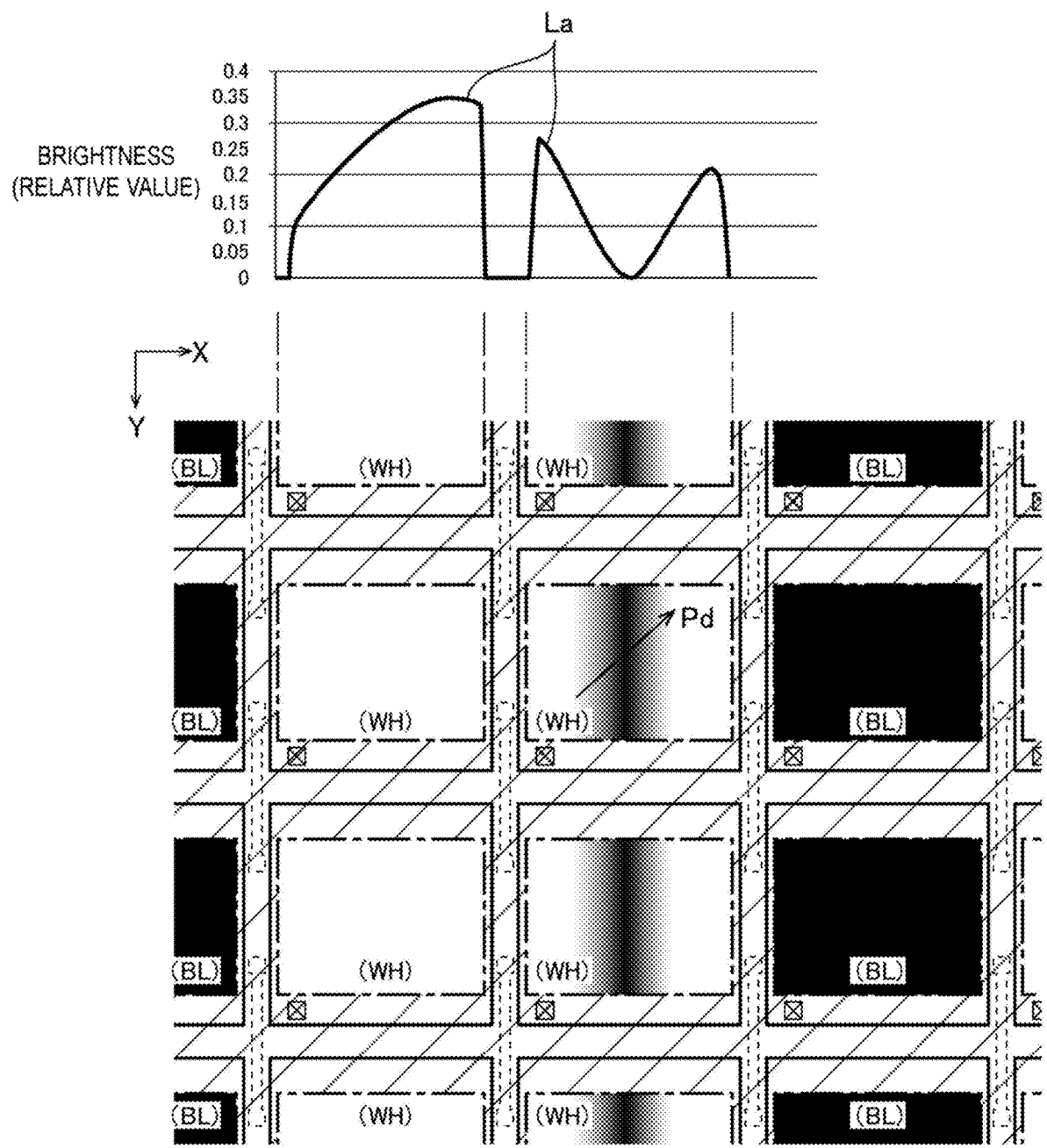
FIG. 11 is an explanatory view when black lines extending in the second direction are displayed in the electro-optical device according to the comparative example illustrated in FIGS. 10A and 10B.
Figure 12:
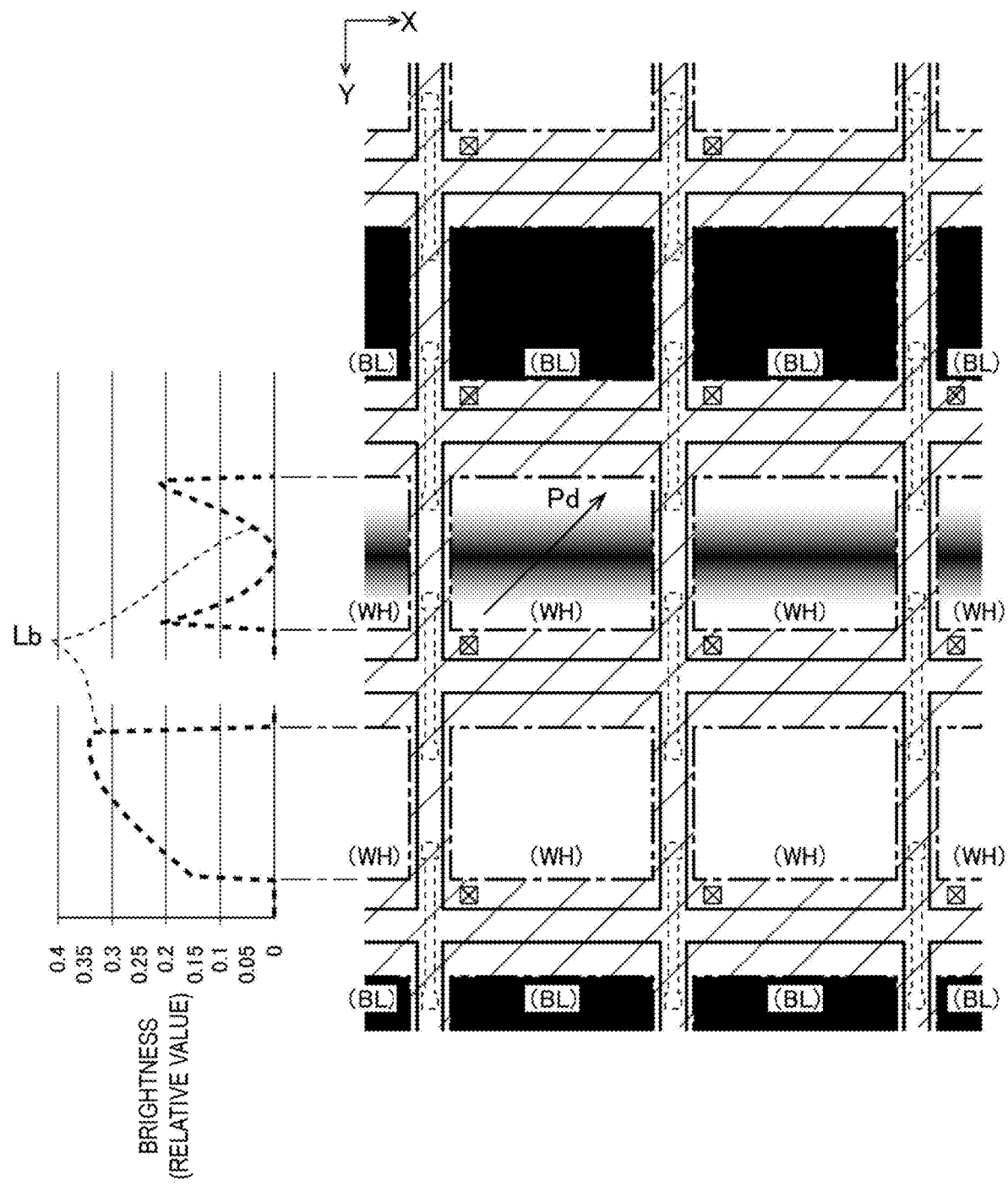
FIG. 12 is an explanatory view when black lines extending in the first direction are displayed in the electro-optical device according to the comparative example illustrated in FIGS. 10A and 10B.

FIGS. 10A and 10B are explanatory views of an electro-optical device according to the comparative example, including an explanatory view A illustrating a planar layout, for example, of the pixel electrodes 9a, and an explanatory view B comparing brightness distribution indicated by a solid line La in FIG. 11 with brightness distribution indicated by a dotted line Lb in FIG. 12. FIG. 11 is an explanatory view when black lines extending in the second direction Y are displayed in the electro-optical device according to the comparative example illustrated in FIGS. 10A and 10B. FIG. 12 is an explanatory view when black lines extending in the first direction X are displayed in the electro-optical device according to the comparative example illustrated in FIGS. 10A and 10B.

In FIG. 10A, the first light-shielding portions 1x extending in the first direction X include scanning lines (not illustrated), while the second light-shielding portions 1y extending in the second direction Y include data lines (not illustrated). A width in the second direction Y of each of the first light-shielding portions 1x is greater than a width in the first direction X of each of the second light-shielding portions 1y. In each of the openings 1z, a size in the second direction Y is smaller than a size in the first direction X. The pre-tilt orientation Pd of the liquid crystal molecules heads from 0730 o'clock to 0130 o'clock.

In the electro-optical device according to the comparative example, a center of each of the pixel electrodes 9a and a center of each of the openings 1z match with each other in both the first direction X and the second direction Y. In the second direction Y, a width in the second direction Y of each of regions in which the pixel electrodes 9a overlap with the first light-shielding portions 1x on a side facing in the pre-tilt orientation Pd is therefore identical to a width in the second direction Y of each of regions in which the pixel electrodes 9a overlap with the first light-shielding portions 1x on an opposite side facing in the pre-tilt orientation Pd.

In the electro-optical device, horizontal electric fields generated by adjacent ones, in the first direction X, of the pixel electrodes 9a in the pixels on the side facing in the pre-tilt orientation Pd would cause the inappropriate orientation regions R1 in which orientations of the liquid crystal molecules are damaged to occur. Horizontal electric fields generated by adjacent ones, in the second direction Y, of the pixel electrodes 9a in the pixel on the side facing in the pre-tilt orientation Pd would cause the inappropriate orientation regions R2 in which orientations of the liquid crystal molecules are damaged to occur.

Specifically, as illustrated in FIG. 11, when black lines extending in the second direction Y (longitudinal direction) are displayed on a white background, the inappropriate orientation regions R1 (see FIG. 10A) in which horizontal electric fields generated by the pixel electrodes 9a in the pixels for black display (BL) damage the orientations of the liquid crystal molecules appear on the side facing in the pre-tilt orientation Pd, lowering brightness in the pixels for white display (WH) adjacent to the pixels for black display (BL). As illustrated in FIG. 12, when black lines extending in the first direction X (lateral direction) are displayed on a white background, the inappropriate orientation regions R2 (see FIG. 10A) in which horizontal electric fields generated by the pixel electrodes 9a in the pixel for black display (BL) damage the orientations of the liquid crystal molecules appear on the side facing in the pre-tilt orientation Pd, lowering brightness in the pixels for white display (WH) adjacent to the pixels for black display (BL).

In FIG. 10B, the brightness distribution indicated by the solid line La in FIG. 11 and the brightness distribution indicated by the dotted line Lb in FIG. 12 are compared with each other. As can be seen from FIG. 10A, when the black lines extending in the first direction X (lateral direction) are displayed on the white background, a ratio of the inappropriate orientation regions R2 relative to the openings 1z is greater than a ratio of the inappropriate orientation regions R1 relative to the openings 1z when the black lines extending in the second direction Y (longitudinal direction) are displayed on the white background. As illustrated in FIG. 10B, a degree of reduction in display quality due to a reduction in brightness when horizontal electric fields are generated in the second direction Y is therefore greater than a degree of reduction in display quality due to a reduction in brightness when horizontal electric fields are generated in the first direction X.

Example of Installation to Electronic Apparatus

Figure 13:
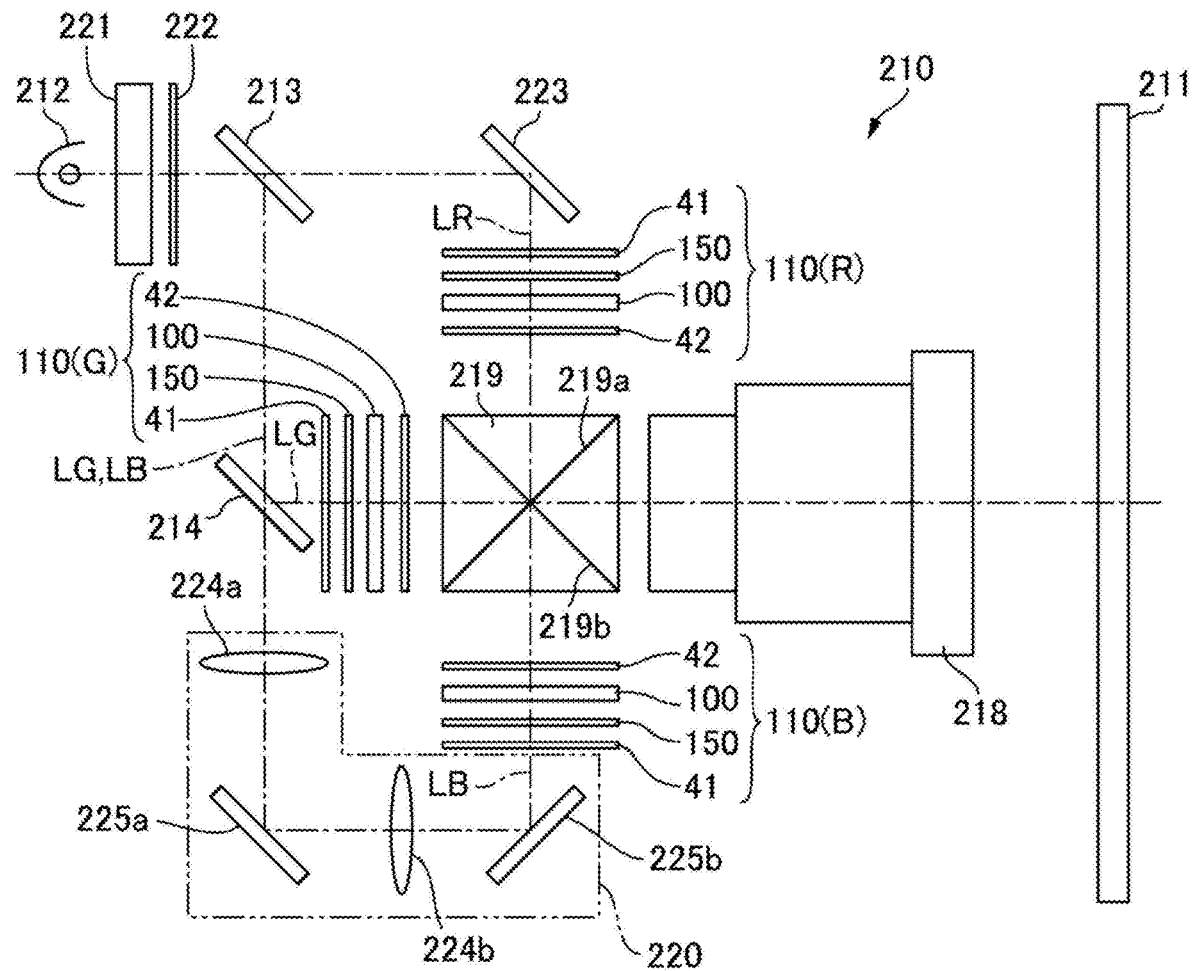
FIG. 13 is a schematic block diagram of a projection-type display apparatus (electronic apparatus) employing the electro-optical device to which the invention is applied.

FIG. 13 is a schematic block diagram of a projection-type display apparatus (electronic apparatus) employing the electro-optical device 100 to which the invention is applied. Note that in the descriptions below, although a plurality of optical modulators 110(R), (G), and (B) are used to which light in mutually different wavelength regions are supplied, the electro-optical device 100 to which the invention is applied is used in the optical modulators 110(R), (G), and (B).

A projection-type display apparatus 210 illustrated in FIG. 13 is a forward projection type projector configured to project an image to a screen 211 provided in front of the projector. The projection-type display device 210 includes a light source 212, dichroic mirrors 213 and 214, optical modulators 110(R), (G), and (B), a projection optical system 218, a cross dichroic prism 219, and a relay system 220. Each of the optical modulators 110(R), (G), and (B), which is the optical modulator 110 described with reference to FIG. 2 and the like, includes, along the traveling direction of the light L, a first polarizing element 141, an optical compensation element 150, the electro-optical device 100, and a second deflection element 142.

The light source 212 is configured by an extra-high-pressure mercury lamp for supplying light including red light, green light, and blue light, for example. The dichroic mirror 213 is configured to be transmissive of red light LR from the light source 212 and reflective of green light LG and blue light LB. The dichroic mirror 214 is configured to be transmissive of blue light LB and reflective of green light LG in the green light LG and the blue light LB reflected by the dichroic mirror 213. As described above, the dichroic mirrors 213 and 214 configure a color separation optical system configured to separate light emitted from the light source 212 into the red light LR, the green light LG, and the blue light LB. An integrator 221 and a polarization conversion element 222 are sequentially arranged, between the dichroic mirror 213 and the light source 212, from the light source 212. The integrator 221 equalizes the illuminance distribution of the light irradiated from the light source 212. The polarization conversion element 222 converts the light from the light source 212 into polarized light having a specific vibration direction such as s-polarized light.

The optical modulator 110(R) modulates the red light LR transmitted through the dichroic mirror 213 and reflected by a reflection mirror 223 in accordance with image signals. The red light LR incident on the optical modulator 110(R) and then transmitted through the first polarizing element 141 is converted into, for example, s-polarized light. The electro-optical device 100 is configured to convert the s-polarized light being entered into p-polarized light through modulation in accordance with an image signal (for half tone, circularly polarized light or elliptically polarized light). Further, the second polarized light element 142 is configured to block the s-polarized light, but allow the p-polarized light to pass through. Therefore, the optical modulator 110(R) modulates the red light LR in accordance with an image signal and emits the red light LR being modulated toward the cross dichroic prism 219.

The optical modulator 110(G) modulates, in accordance with an image signal, the green light LG reflected by the dichroic mirror 213 and then reflected by the dichroic mirror 214 and emits the green light LG being modulated toward the cross dichroic prism 219.

The optical modulator 110(B) modulates, in accordance with an image signal, the blue light LB reflected by the dichroic mirror 213 and passed through the dichroic mirror 214 and then the relay system 220 and emits the blue light LB being modulated toward the cross dichroic prism 219.

The relay system 220 includes relay lenses 224a and 224b and reflection mirrors 225a and 225b. The relay lenses 224a and 224b are provided to prevent the loss of light due to the long optical path of the blue light LB. The relay lens 224a is disposed between the dichroic mirror 214 and the reflection mirror 225a.

The relay lens 224b is disposed between the reflection mirrors 225a and 225b. The reflection mirror 225a is disposed to reflect, toward the relay lens 224b, the blue light LB transmitted through the dichroic mirror 214 and then emitted from the relay lens 224a. The reflection mirror 225b is disposed to reflect the blue light LB emitted from the relay lens 224b toward the optical modulator 110 (B).

The cross dichroic prism 219 serves as a color combining optical system in which two dichroic films 219a and 219b are orthogonally arranged in an X shape. The dichroic film 219a reflects the blue light LB and transmits the green light LG. The dichroic film 219b reflects the red light LR and transmits the green light LG.

Therefore, the cross dichroic prism 219 is configured to synthesize the red light LR, the green light LG, and the blue light LB respectively modulated by the optical modulators 110(R), (G), and (B), and to emit the red light LR, the green light LG, and the blue light LB being modulated toward the projection optical system 218. The projection optical system 218, which includes a projection lens (not illustrated), is configured to project the light synthesized by the cross dichroic prism 219 onto the screen 211.

Note that such a configuration may also be employed where a $\lambda/2$ phase difference compensation element is provided for the optical modulators 110(R) and (B) for red and blue light, in which the light incident on the cross dichroic prism 219 from the optical modulators 110(R) and (B) is modulated into s-polarized light, and where the optical modulator 110(G) is configured without a $\lambda/2$ phase difference compensation element, in which the light incident on the cross dichroic prism 219 from the optical modulator 110(G) is modulated into p-polarized light.

A color synthesizing optical system can be configured to be optimized in view of the reflection characteristics of the dichroic films 219a and 219b by modulating the light incident on the cross dichroic prism 219 into different types of polarized light. The red light LR and the blue light LB reflected by the dichroic films 219a and 219b as described above may be modulated into s-polarized light, and the green light LG that transmits the dichroic films 219a and 219b may be modulated into p-polarized light, taking advantage of the dichroic films 219a and 219b normally having excellent reflection characteristics for s-polarized light.

Other Projection-Type Display Apparatuses

A projection-type display apparatus may be configured to use, as a light source unit, an LED light source or a laser light source configured to emit light in various colors, and the like to supply light in various colors emitted from the light source to another electro-optical device.

The electro-optical device to which the invention is applied may be used for a variety of electronic apparatuses such as a projection-type head-up display (HUD) and a direct viewing-type head-mounted display (HMD) in addition to the above electronic apparatuses.

The entire disclosure of Japanese Patent Application No. 2018-031640, filed Feb. 26, 2018 is expressly incorporated by reference herein.

What is claimed is:
1. An electro-optical device comprising:
a first substrate having, at one surface of the first substrate, a pixel electrode having translucency, a pixel switching element corresponding to the pixel electrode, and a first oriented film covering the pixel electrode and a plurality of terminals to be electrically coupled to a flexible wiring substrate;
a second substrate having, at a surface of the second substrate
facing the first substrate, a second oriented film; and a liquid crystal layer provided between the first substrate and the second substrate, wherein when viewed in a normal line direction with respect to the first substrate in a plan view, the pixel electrode overlaps with an opening surrounded by a first light-shielding portion extending in a first direction and a second light-shielding portion extending in a second direction intersecting with the first direction,
a width of the first light-shielding portion in the second direction is greater than a width of the second light-shielding portion in the first direction, a size of the opening in the second direction is smaller than a size of the opening in the first direction, in the liquid crystal layer, the liquid crystal molecules are pre-tilted by the first oriented film and the second oriented film in an orientation intersecting with the first direction and the second direction, respectively, where first ends of the liquid crystal molecules at the second substrate are toward the orientation with respect to second ends of the liquid crystal molecules at the first substrate, and a center of the pixel electrode is arranged at a position shifted toward the orientation in a direction along the second direction with respect to a center of the opening, the plurality of terminals are formed along one side of the first substrate, the one side extending in the first direction, the first light-shielding portion is provided with a contact hole through which the pixel electrode is electrically coupled to an electrode provided between the pixel switching element and the pixel electrode at a position overlapping with an end of the pixel electrode, and the orientation of the liquid crystal molecules opposes the one side of the first substrate and the end of the pixel electrode.

2. The electro-optical device according to claim 1, wherein a gap between the pixel electrode and a pixel electrode adjacent thereto in the second direction is greater than a gap between the pixel electrode and a pixel electrode adjacent thereto in the first direction.

3. The electro-optical device according to claim 1, wherein the first light-shielding portion includes a scanning line extending in the first direction at the one surface of the first substrate, and the second light-shielding portion includes a data line extending in the second direction at the one surface of the first substrate.

4. The electro-optical device according to claim 1, wherein the first light-shielding portion is provided with a contact hole through which the pixel electrode is electrically coupled to an electrode provided between the first substrate and the pixel electrode at a position overlapping with an end of the pixel electrode, the end being positioned on the orientation in the direction along the second direction.

5. The electro-optical device according to claim 1, wherein a plurality of the pixel electrodes are arranged in the first direction and the second direction, and a pitch in the first direction and a pitch in the second direction are identical to each other.

6. The electro-optical device according to claim 1, wherein the first oriented film and the second oriented film respectively are columnar structure objects inclined with respect to the first substrate and the second substrate.

7. The electro-optical device according to claim 1, wherein the liquid crystal molecules have negative dielectric anisotropy.

8. An electronic apparatus comprising the electro-optical device according to claim 1.

* * * * *